United States Patent [19]

Schieble et al.

[11] Patent Number: 4,569,045

[45] Date of Patent: Feb. 4, 1986

[54] 3-WIRE MULTIPLEXER

[75] Inventors: David L. Schieble, Milwaukee; Walter L. Rutchik, Wauwatosa; Merle R. Swinehart, Brookfield, all of Wis.

[73] Assignee: Eaton Corp., Cleveland, Ohio

[21] Appl. No.: 501,661

[22] Filed: Jun. 6, 1983

[51] Int. Cl.[4] .............................................. H04J 3/02
[52] U.S. Cl. ...................... 370/85; 340/310 A; 370/110.1
[58] Field of Search ............... 370/85, 100, 110.1, 370/88, 97; 179/170 J; 340/310 R, 310 A

[56] References Cited

U.S. PATENT DOCUMENTS

| | | | |
|---|---|---|---|
| 3,789,145 | 1/1974 | Shah et al. | 370/85 |
| 3,916,108 | 10/1975 | Schwartz | 370/85 |
| 4,053,714 | 10/1977 | Long | 370/85 |
| 4,058,678 | 11/1977 | Dunn et al. | 340/310 R |
| 4,242,749 | 12/1980 | Takezoe | 370/85 |
| 4,373,183 | 2/1983 | Means et al. | 370/85 |
| 4,380,052 | 4/1983 | Shima | 370/85 |
| 4,386,426 | 5/1983 | Pugh | 370/85 |
| 4,418,333 | 11/1983 | Schwarzbach et al. | 340/310 A |

FOREIGN PATENT DOCUMENTS 2060319 4/1981 United Kingdom ............ 179/170 J

Primary Examiner—Douglas W. Olms
Assistant Examiner—Frank M. Scutch, III
Attorney, Agent, or Firm—Andrus, Sceales, Starke & Sawall

[57] ABSTRACT

The invention provides a 3-wire multiplexing system exhibiting high noise immunity, particularly suitable for industrial control applications. A master station provides AC power, and clocking and synchronization information, for a plurality of remote transmitter and receiver stations. A 3-wire cable links the master station and the remote stations. Two wires of the cable are power lines L1 and L2 and are isolated from each station by respective transformers. The third wire is a data line and is optically coupled to the remote stations. The remote stations are thus completely isolated from the cable, yet powered, clocked and synchronized therefrom without the need for local power supplies or local clocks. The signaling method switches the data line onto the power lines, and provides a high degree of data security by recognizing both the polarity and the position of a pulse on the data line within an AC cycle. The system further provides diagnostics in remote receivers including half cycle polarity and position decoding, error detection, fail state selection to fail OFF or fail ON or remain in the last valid state, and two scans alike detection.

33 Claims, 10 Drawing Figures

4,569,045

3-WIRE MULTIPLEXER

BACKGROUND AND SUMMARY

The invention relates to multiplexers with high noise immunity, suitable for use in industrial control applications.

Industrial control applications often require input from tens or hundreds of remote sensors. Wiring these devices to a central control panel can become complex and costly. Multiplexing reduces system complexity by transmitting all signals on a common communication media. In addition, a multiplexed system reduces installation time, lowers maintenance, and provides system flexibility.

The present invention provides a 3-wire, fully isolated multiplex system. The high noise immunity afforded by the invention is particularly desirable in electrically noisy environments such as industrial control applications.

The invention features a master-controlled system. A master station provides all power, clock, and synchronization signals to remote stations. A 3-wire shielded communication cable links the master station and the remote stations. The master station and each remote station is fully isolated from the communication cable. Each remote station may be at a different ground potential with no effect on system operation. Signal transmission is in digital form, and analog quantities may be digitized and transmitted on adjacent channels. Transmitter and receiver type remote stations may communicate directly, and real time applications are possible. A simple yet high security data encoding technique is used. Remote receiver stations feature optional built-in error detection and selectable fail-safe modes.

The basic multiplexer of the invention includes a master station, a plurality of remote stations, and a cable comprising three wires linking the master station and the remote stations. Two wires of the cable are power lines L1 and L2 for powering, clocking and synchronizing the remote stations from the master station. The remote stations do not require local power supplies and do not require local clocks. Isolation is achieved by a combination of transformer and optical techniques. AC power, clock, and sync signals are all transformer coupled. Data is on the third wire and is optically coupled. In all cases, no ohmic connection exists between the cable and any of the master station or remote stations.

The signaling system for data encoding provides high data security without wasted channel time slot space. The encoding format is efficient, yet highly secure. Data is transmitted by a combination of active and passive encoding. The data line is switchingly connected to and then disconnected from one of the power lines in accordance with a given signaling format.

In the preferred embodiment, the power lines carry AC power, and the switching system comprises switchingly connecting the AC power to the data line at designated times. The AC signal also provides clocking. Each multiplexed channel consists of one or more complete cycles of the AC clock. In the single cycle embodiment one logic state is encoded by closing a switch between the AC signal and the data line during the positive half cycle of the clock and opening the switch during the negative half cycle. The opposite logic state is encoded by opening the switch during the positive half and closing it during the negative half. Both active (switch closed) and passive (switch open) states are required to establish valid data, i.e. during one of the half cycles there must be current flow on the data line, either positive or negative, and during the other half cycle there must be a null state on the data line, with no current flow. In remote receiver stations, detector circuitry checks both the position within a cycle and the polarity of each data pulse. Using this method, errors and failed equipment are easily detected.

In one particular embodiment, the system provides 32 channels scanned in 1.5 milliseconds. A 25 kilohertz AC square wave provides power and clocking. The system enables line voltage of 30 volts RMS, whereby Class 2 wiring methods may be used. Signal current of 30 milliamps is afforded.

DETAILED DESCRIPTION

Figure 1:
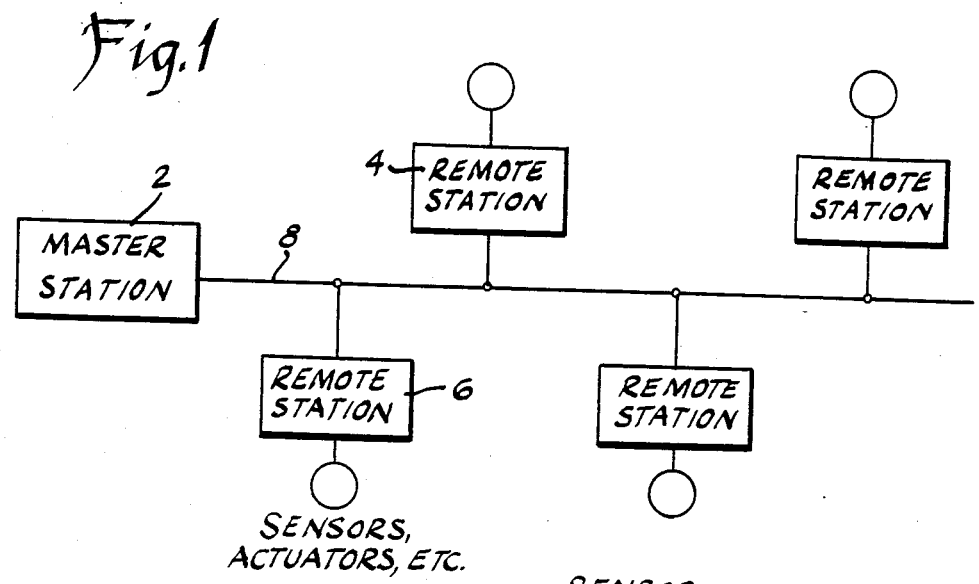
FIG. 1 is a block diagram of a 3-wire multiplexer constructed in accordance with the invention.

FIG. 1 shows in block form a high noise immunity 3-wire multiplexing system constructed in accordance with the invention. The system includes a master station 2, a plurality of remote stations such as 4 and 6, and a cable 8 linking the master station and all of the remote stations. Each remote station may have one or more associated sensors and/or actuators for performing given tasks. In the simplest embodiment, master station 2 provides power and clocking for the remote stations, and the latter may communicate directly with each other on respective multiplex channels. The remote stations do not require local power supplies or local clocks. The remote stations may communicate with the master station if the latter is equipped with optional transmitter and/or receiver sections comparable to that in the remote stations.

Figure 2:
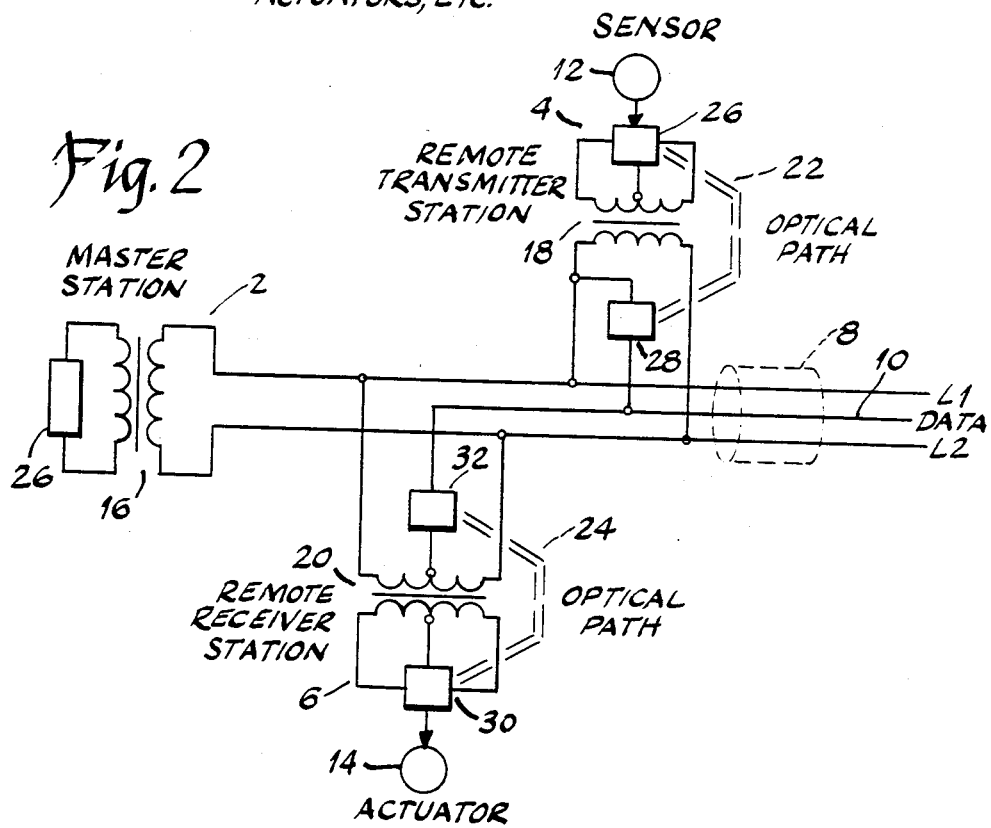
FIG. 2 is a schematic circuit diagram of the 3-wire multiplexer of FIG. 1.

FIG. 2 shows a cable comprising three wires and a shield 8. Two wires of the cable are power lines L1 and L2 for powering and for clocking the remote stations from the master station. The third wire 10 is a data line. Remote station 4 is shown as a transmitter with associated sensor 12. Remote station 6 is shown as a receiver with associated actuator 14. Master station 2 and each remote station is preferably isolated from power lines L1 and L2 of cable 8 by respective isolation transformers such as 16, 18 and 20. The remote stations are preferably isolated from data line 10 of cable 8 by respective optical couplings 22 and 24.

In preferred form, master station 2 includes waveform generating and power switching circuitry 26 providing a squared AC power and clocking waveform through isolation transformer 16 onto power lines L1 and L2. The master station includes means for skipping one or more AC cycles in the waveform, which synchronizes the system and starts a new scan. One or more AC cycles are used per multiplex channel, having at least two designated periods for encoding the data.

Remote transmitter station 4 includes addressed channel responsive means 26 comprising an internal counter clocked by the AC waveform on L1 and L2 through isolation transformer 18, to be described. The counter is reset by the skipped cycle, and counts to a given channel number loaded into the counter. The addressed channel responsive means 26 then optically actuates a switch 28 which connects one of the power lines to data line 10 for either the positive or negative half cycle of the AC signal, depending on the data logic state from sensor 12. The signaling format uses both pulse position and polarity for data encoding, to be described.

Remote receiver station 6 likewise includes channel responsive means 30 with an internal counter clocked through isolation transformer 20 from AC lines L1 and L2, and likewise reset by the missing cycle. When counted to its designated channel number, channel responsive means 30 optically actuates switch 32 to close and complete a circuit therethrough to read data line 10 for the entire AC cycle channel. The enabled data connection is read through an optical coupling and decoded to appropriately activate or deactivate actuator 14. The decoding involves checking the presence or absence of current flow on data line 10, and the polarity, for both half cycles, followed by a logic operation in accordance with a predetermined truth table if error detection or other diagnostics is desired. The receiver data connection can be continuously enabled if the total load on the data line is not excessive.

Figure 3:
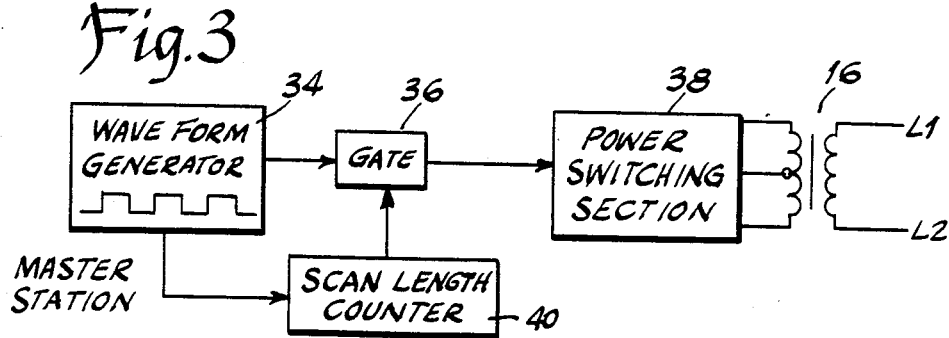
FIG. 3 is a block diagram of the master station of FIG. 2.

Referring to FIG. 3, master station 2 includes a square wave generator 34 outputting an AC waveform through gate 36 to power switching section 38 for coupling through isolation transformer 16 to lines L1 and L2. The AC waveform provides power and clocking for the remote stations. Gate 36 is normally enabled by the output of scan length counter 40 as clocked by waveform generator 34. The scan length is set by the number loaded into counter 40. When counter 40 reaches this number, it disables gate 36 for that AC cycle and thus there is a skipped cycle in the waveform to power switching section 38. In one embodiment, a 50 kilohertz square waveform generator is used the output of which is divided by two by flip-flop 48, FIG. 4, to yield 25 kilohertz, affording a scan length time less than 1.5 milliseconds for a scan length of 32 channels. The line voltage across L1 and L2 is 30 volts RMS.

Figure 4:
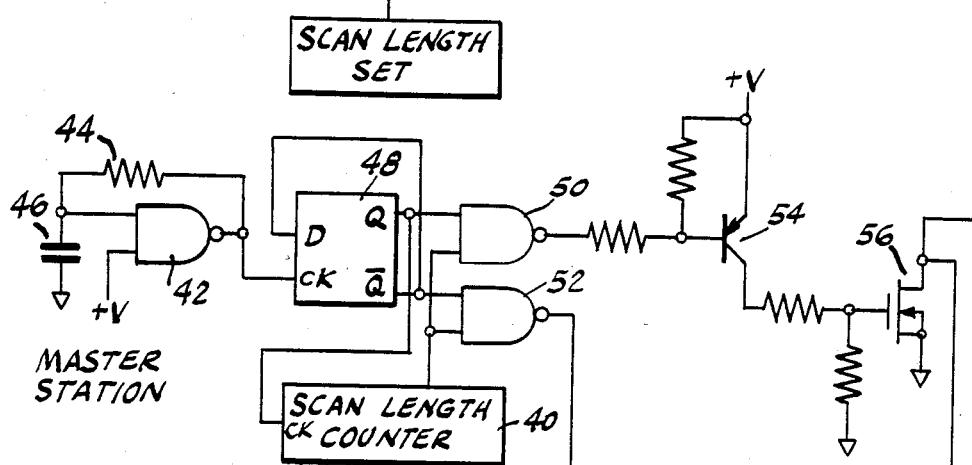
FIG. 4 is a schematic circuit diagram of the master station of FIG. 3.
Figure 4:
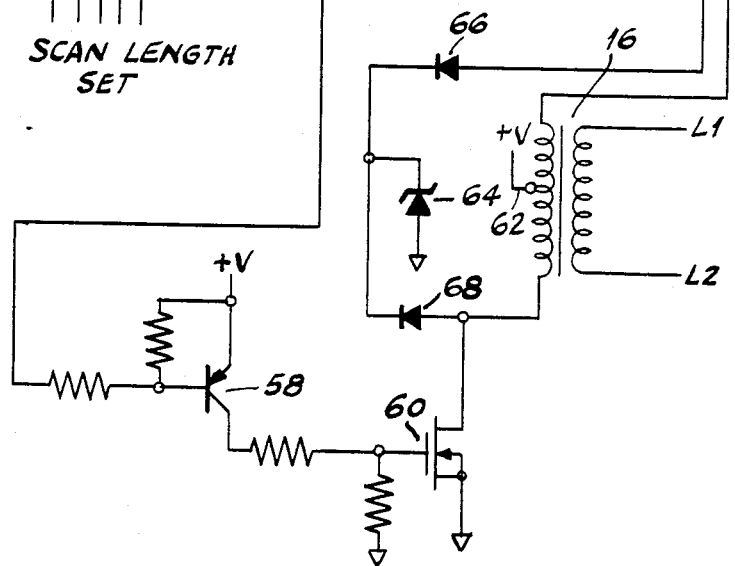

FIG. 4 shows in detail the circuitry of the master station of FIG. 3. Waveform generator 34 is a standard oscillator circuit including a NAND gate 42 having one input connected to a given polarity voltage and its output fed back through an RC circuit to the other input. When both inputs to NAND gate 42 are high, its output goes low, which low state is fed back through resistor 44 but delayed until capacitor 46 is charged. This low state at the input causes the output of NAND gate 42 to go high, which high state is delayed through the RC combination to the input of the NAND gate and the cycle repeats. The output of NAND gate 42 is transferred through flip-flop 48 as the Q output to NAND gate 50, and its inverse is the $\overline{Q}$ output to NAND gate 52. The Q output of flip-flop 48 also clocks scan length counter 40, the output of which is connected to the other inputs to NAND gates 50 and 52. The output of counter 40 is normally high, such that the outputs of NAND gates 50 and 52 alternate between opposite polarity states as controlled by Q and $\overline{Q}$. When counter 40 reaches the given scan length number, determining the number of channels, its output goes low which disables gates 50 and 52, and provides the skipped cycle for synchronization.

The output of NAND gate 50 is connected to the base of a bipolar transistor 54 having its emitter connected to a given voltage and its collector connected to the gate of a power FET (field effect transistor) 56. When the output of NAND gate 50 is high, transistor 54 is biased off, whereby there is no voltage at the gate of FET 56 and thus the latter is off. When the output of NAND gate 50 is low, transistor 54 is biased into conduction, whereby to apply gate potential to FET 56 biasing the latter into conduction. The operation of transistors 58 and 60 from the output of NAND gate 52 is comparable. Power FETs 56 and 60 are thus alternately in conduction, providing alternating conductive paths therethrough from the positive voltage connected center tap 62 of isolation transformer 16. In the alternating off states of power FETs 56 and 60, voltage is established across zener diode 64 through respective diodes 66 and 68. When the output of counter 40 goes low, the outputs of NAND gates 50 and 52 each goes high, whereby transistors 54 and 58 are off at the same time, thus providing a skipped cycle in the waveform on L1 and L2.

Figure 5:
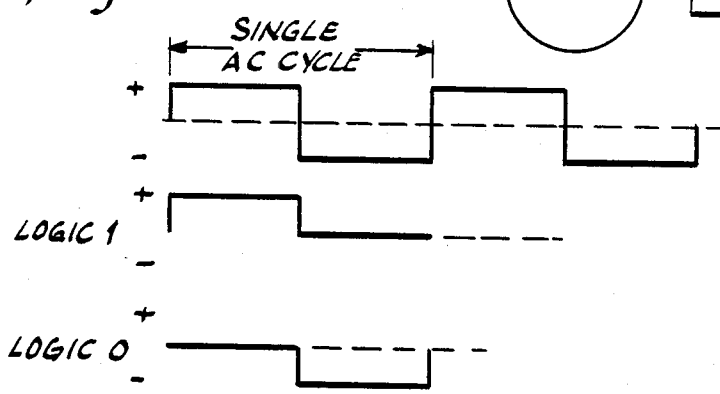
FIG. 5 is a timing diagram illustrating the signaling format and encoding system of the invention.

FIG. 5 shows in the first line the AC waveform appearing across L1 and L2. The signaling system uses a single AC cycle per multiplex channel. Data security is provided by recognizing both the polarity and the position of a data pulse within a cycle. The second line in FIG. 5 shows the format of a LOGIC 1, represented by a positive pulse for the first half of the cycle and a null state for the second half of the cycle. The third line of FIG. 5 shows the format for a LOGIC 0, represented by a null state for the first half of the cycle and a negative state for the second half of the cycle. These logic signals are generated by connecting data line 10 to power line L1 at a designated time within the cycle, to be described.

Figure 6:
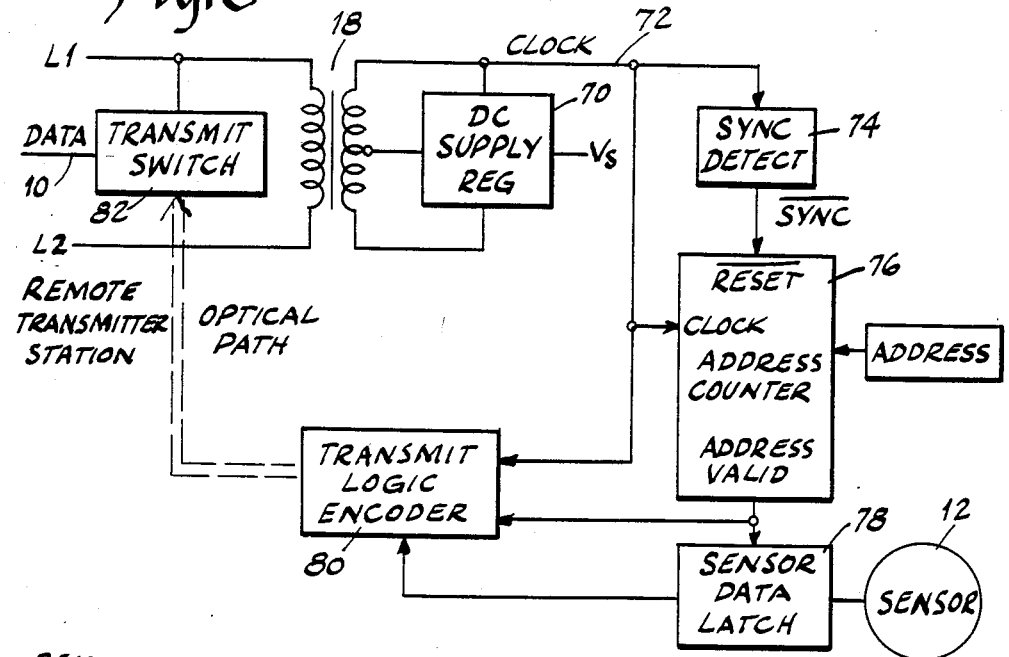
FIG. 6 is a block diagram of the remote transmitter station of FIG. 2.

FIG. 6 shows remote transmitter station 4 of FIG. 2. Power for the remote transmitter station is supplied from L1 and L2 through isolation transformer 18 to DC supply and regulator 70 such as a 7812 supply affording 12 volts at $V_S$. The AC waveform on line 72 provides clocking and synchronization. Line 72 is connected to synchronization detect circuit 74 having an output which is normally high, but which goes low in response to the missing cycle in the AC waveform. When the output of sync detect circuit 74 goes low, address counter 76 is reset and begins counting as clocked by clock line 72. When counter 76 reaches the address channel number loaded therein, its output goes high indicating a valid address, which output enables a sensor data latch 78 to pass the logic state of sensor 12 therethrough to transmit logic circuit 80 and to hold the sensor state constant throughout the addressed channel. The output of counter 76 is also connected to transmit logic 80 to enable the latter to compare clock line 72 against the output of data latch 78 and activate an optical actuation signal during either the first or the second half of the AC cycle depending on the data state from sensor 12. The optical actuation closes transmit switch 82 to connect the power line to data line 10 for the given half cycle of the channel. A half cycle of the AC waveform is thus placed on the data line during the addressed channel, the first half cycle indicating a LOGIC 1, as seen in FIG. 5, and the second half cycle indicating a LOGIC 0.

Figure 7:
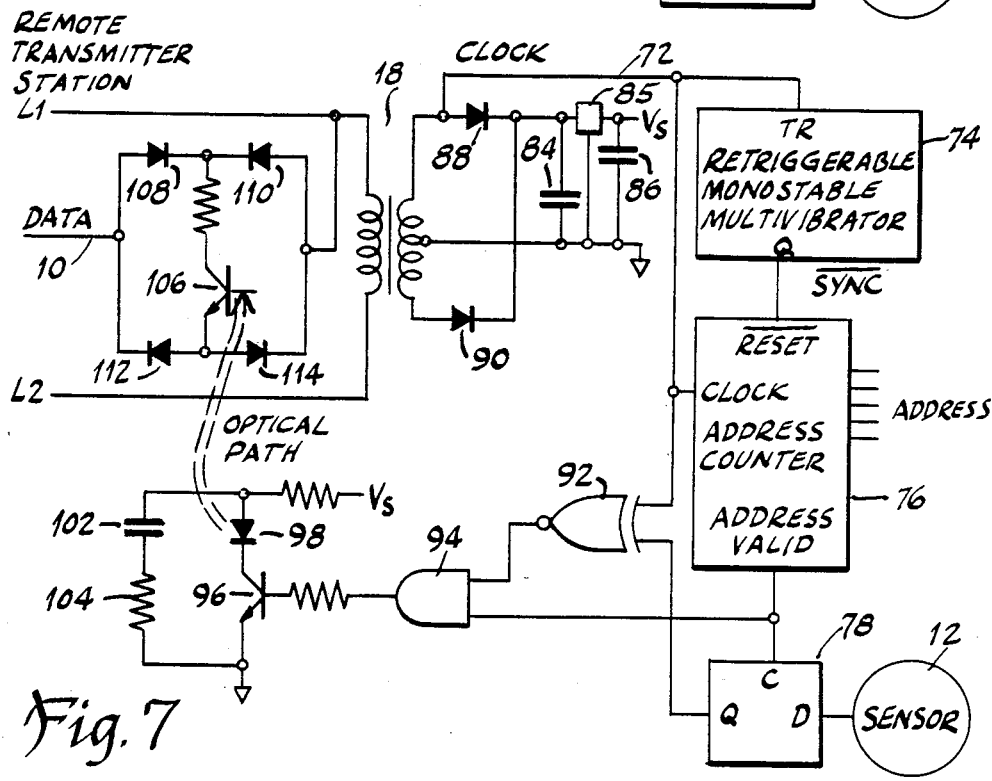
FIG. 7 is a schematic circuit diagram of the remote transmitter station of FIG. 6.

FIG. 7 shows in detail the circuit for remote transmitter station 4 of FIGS. 2 and 6. The DC power supply 70 is shown with its input and output filter capacitors 84 and 86, rectifying diodes 88 and 90, and 7812 type voltage regulator 85 affording the regulated supply voltage $V_s$, preferably 12 volts, for powering the electronic circuitry in the remote transmitter station. Sync detect circuit 74 is a retriggerable monostable multivibrator, such as an MC14538, with a time constant longer than one cycle of the AC waveform such that its Q output is normally high but goes low in response to the missing cycle on clock line 72 connected to its trigger input. When the Q output of multivibrator 74 goes low, it resets address counter 76, such as a CD40103, which then begins counting as clocked by the AC waveform on clock line 72 until the loaded address channel number is reached, at which time its output goes high, indicating a valid address.

The address valid output of counter 76 is connected to the clock input of sensor data latch 78, such as a 4013 flip-flop. The D input of flip-flop 78 is connected to sensor 12, and the Q output of flip-flop 78 is connected to one input of exclusive NOR gate 92, whose other input is connected to clock line 72. AND gate 94 has one input supplied from exclusive NOR gate 92 and the other input supplied from the address valid output of counter 76. Exclusive NOR gate 92 is a comparator having an output which is high when both of its inputs are the same.

If sensor 12 has a LOGIC state 1, then the output of exclusive OR gate 92 will be high during the first half of the AC cycle and low during the second half of the AC cycle. During the first half cycle, both inputs to gate 92 are high. However, during the second half cycle the inputs to gate 92 are not the same; the input from sensor 12 is still high, but the other input from clock line 72 has transitioned low, whereby the output of gate 92 goes low during the second half cycle. It is thus seen that when sensor 12 has a LOGIC state 1, the output of gate 92 is high only during the first half of the AC cycle.

If sensor 12 has the opposite state, a LOGIC state 0, then the output of exclusive OR gate 92 will be high only during the second half of the AC cycle. During the first half of the AC cycle, the inputs to gate 92 are different; the input from sensor 12 being low, and the input on clock line 72 being high. The output of gate 92 is thus low during the first half cycle. During the second half cycle, both inputs to gate 92 are low, and hence the output of gate 92 goes high.

The output state of exclusive OR gate 92 is enabled through AND gate 94 whose other input is high for both half cycles, i.e. the address valid output from counter 76 is high during the entire addressed channel. The output of AND gate 94 will thus be high during the first half of the AC cycle if the state or sensor 12 is a LOGIC 1, and the output of AND gate 94 will be high during the second half of the AC cycle if the LOGIC state of sensor 12 is 0.

A high state at the output of AND gate 94 drives bipolar transistor 96 into conduction to complete a circuit from voltage source $V_s$ through light emitting diode 98. Previous to this energization, capacitor 102 has been slowly charged through resistor 104 from the voltage supply. The extra current from discharge of capacitor 102 through LED 98 and transistor 96 supplies enough energy to drive LED 98 to emit enough light without requiring an otherwise higher current supply. Capacitor 102 also supplies enough energy to drive LED 98 for only one channel time slot in case transistor 96 fails shorted. LED 98 is optically coupled to a phototransistor 106 in a bridge circuit comprising diodes 108, 110, 112 and 114 between the power lines and data line 10. If phototransistor 106 is energized during the first half cycle of the AC waveform during the addressed channel, then current flows from L1 through diode 110, through transistor 106, through diode 112 to data line 10. If phototransistor 106 is energized during the second half cycle of the AC waveform, then L1 is low and current instead flows from data line 10 through diode 108, through transistor 106, through diode 114 to L1.

Figure 8:
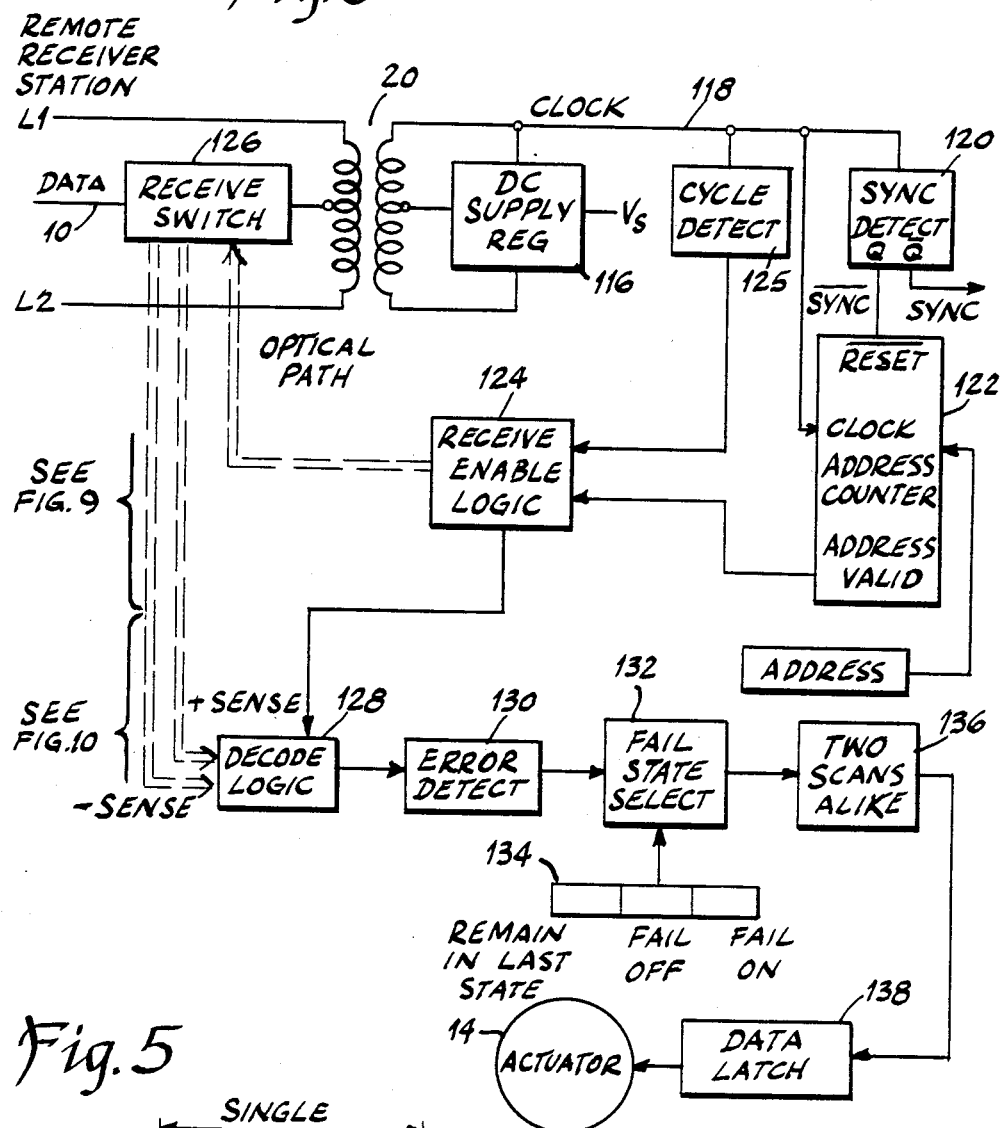
FIG. 8 is a block diagram of the remote receiver station of FIG. 2.

FIG. 8 shows remote receiver station 6 of FIG. 2. The AC waveform on lines L1 and L2 is coupled through isolation transformer 20. DC supply regulator 116, such as a 7812 regulator, supplies DC source voltage $V_s$, such as 12 volts, for the remaining circuitry in the remote receiver station. Clock line 118 carries the transformer coupled AC waveform to sync detect cicruit 120 having a $\overline{Q}$ sync output and a Q sync output. The latter is connected to the reset input of an address counter 122 which is clocked by clock line 118. As in FIG. 6, the Q sync output of sync detect circuit 120 is normally high, but goes low in response to the missing cycle on clock line 118. This low state of the sync output resets counter 122, which then begins counting, as clocked at 118, until it reaches the address channel number loaded thereinto, at which time its output goes high indicating a valid address.

The address valid signal output from counter 122 is input to receive enable logic 124 which has its other input supplied by a cycle detect circuit 125 from clock line 118. Cycle detect circuit 125 responds to the AC waveform on clock line 118 and issues a triggering edge transition somewhere in the middle of each half cycle of the AC waveform. These triggering edge transitions are enabled through receive enable logic 124 by the high state of the address valid signal from counter 122. Receive enable logic 124 optically actuates switch 126 and clocks the decode logic 128 twice during the AC cycle of the addressed channel, once during the first half cycle, and once during the second half cycle. This detection scheme is in accordance with the signaling format of the invention, providing data security by checking both pulse position and polarity, to be described in detail in conjunction with FIGS. 9 and 10.

Actuation of receive switch 126 enables detection of a pulse on data line 10. A positive polarity pulse optically actuates one portion of decode logic 128, and a negative polarity pulse optically actuates another portion of decode logic 128. The latter decodes position and polarity. The output of decode logic 128 provides the data, which may be routed directly to actuator 14. Optionally, the output of decode logic 128 may be routed to diagnostic circuitry for detecting errors, for example at circuit 130. If an error is detected, fail state select logic 132 may command the output to fail ON, fail OFF, or remain in the last valid state, as chosen at user selection switch 134. The data may further be checked to insure that two immediately successive scans yield the same data state, circuit 136, to prevent nuisance or glitch tripping. The data may be held or buffered in a latch 138 before transferral to actuator 14.

Figure 9:
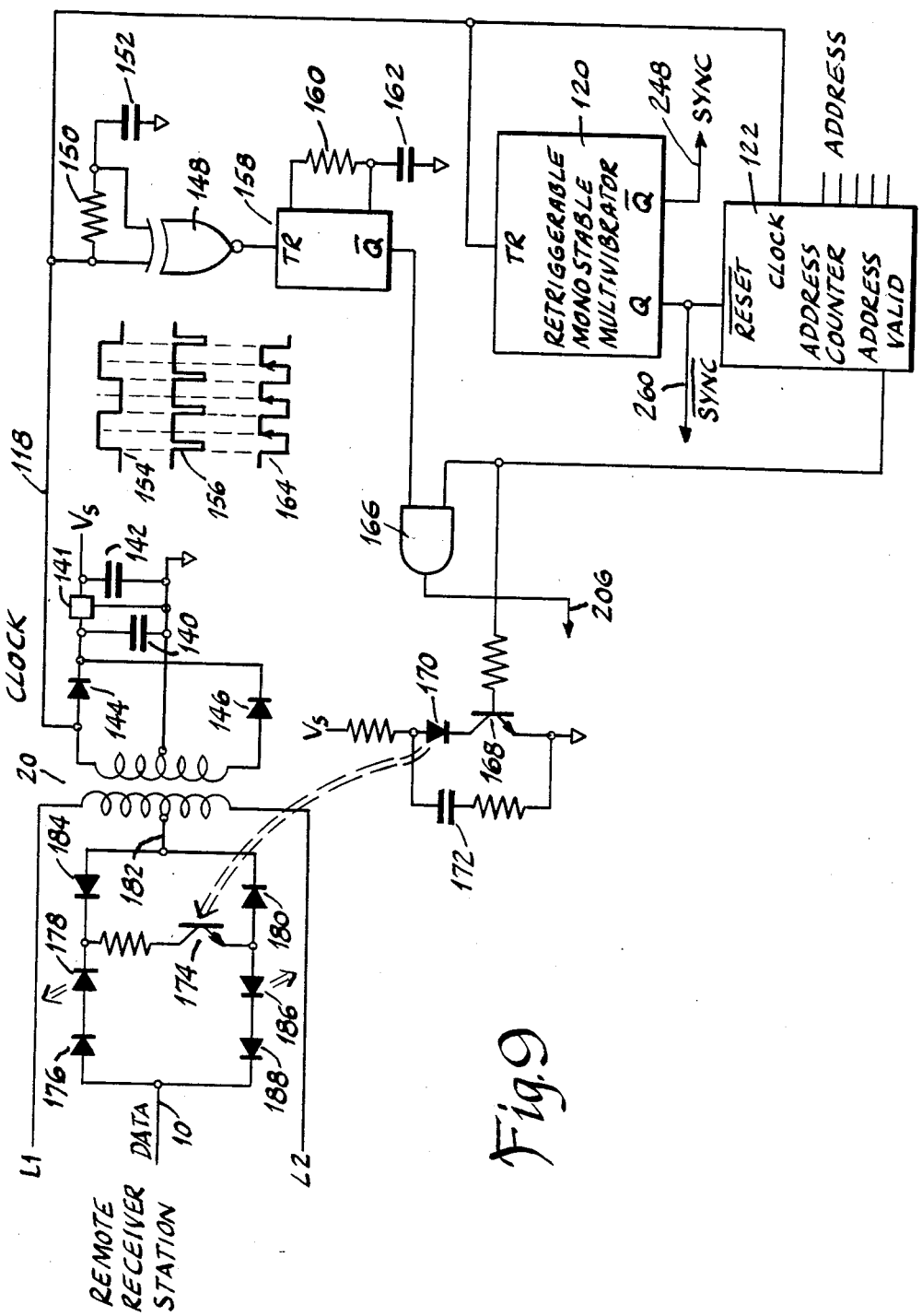
FIG. 9 is a schematic circuit diagram of one portion of the remote receiver station of FIG. 8.

FIG. 9 shows in detail the circuit of the upper portion of the remote receiver station 6 of FIG. 8. The DC supply regulator 116 is shown with its input and output filter capacitors 140 and 142, its rectifying diodes 144 and 146, and a 7812 type regulatator 141, affording supply voltage $V_s$ for powering the remaining circuitry in the remote receiver station. Sync detect circuit 120 is a retriggerable monostable multivibrator, such as an MC14538, with a time constant longer than one cycle of the AC waveform such that its Q output is normally high but goes low in response to the missing pulse on clock line 118 connected to its trigger input. When the Q output of multivibrator 120 goes low, it resets address counter 122, such as a CD40103, which then begins counting as clocked by the AC waveform on clock line 118 until the loaded address channel number is reached, at which time its output goes high, indicating a valid address.

Cycle detect circuit 125 includes an exclusive NOR gate 148 having one input supplied by clock line 118 and its other input delayed from clock line 118 through the RC combination of resistor 150 and capacitor 152 whereby to afford a one-shot multivibrator issuing negative-going one-shot trigger pulses at each edge transition of the AC clock on line 118 whether positive or negative-going. The AC waveform on clock line 118 is shown at 154, and the one-shot pulses from gate 148 are shown at 156. The output of exclusive NOR gate 148 is supplied to the trigger input of a monostable multivibrator 158 which may be the other half of a MC14538 chip used for multivibrator 120 but connected in a nonretriggerable mode. In response to each pulse 156 at the trigger input of multivibrator 158, the latter's $\overline{Q}$ output transitions high after a given delay set by the RC combination of resistor 160 and capacitor 162. This delay is noncritical but is preferred to be about halfway or three-quarters of the way towards the next pulse spike 156. The $\overline{Q}$ pulses 164 are shown to have positive-going transitions about halfway between pulse spikes 156 which thus will cause data sampling about halfway through each half cycle of the AC waveform 154. This ensures that the data will be sampled when it is stable, and not at edge transitions in the AC waveform 154.

Receive enable logic 124 of FIG. 8 includes AND gate 166, FIG. 9, having its inputs from the $\overline{Q}$ output of multivibrator 158 and the address valid output from counter 122. During the addressed channel, the address valid signal is high, and pulses 164 from multivibrator 158 are enabled through gate 166. Thus the output of AND gate 166 will transition high once during the positive half cycle of the AC waveform and once during the negative half cycle of the AC waveform during the addressed channel. A high state at the address valid output of counter 122 also biases transistor 168 into conduction which completes a circuit from voltage source $V_s$ through light emitting diode 170, with extra current supplied by the discharge of capacitor 172 comparably to capacitor 102 of FIG. 7. LED 170 is optically coupled to phototransistor 174 and activates phototransistor 174 connecting receiver light emitting diodes 178 and 186 to the data line. If the total load on the data line is not excessive light emitting diodes 178 and 186 can be directly connected, then transistor 168, light emitting diode 170 and phototransistor 174 are not required. If the data on line 10 is a LOGIC 1, then line 10 will be positive during the first half cycle and will be null during the second half cycle of the AC waveform, FIG. 5. If the data on line 10 is a LOGIC 0, then data line 10 will be null during the first half cycle and will be negative during the second half cycle.

When data line 10 is positive current flows from data line 10 through diode 176, through light emitting diode 178, to center tap 182. When data line 10 is negative, current flows from center tap 182 through light emitting diode 186, through diode 188 to data line 10. It is thus seen that when the data on line 10 during the addressed channel is a LOGIC 1, light will be emitted from LED 178 during the first half cycle, and no light will be emitted from either LED during the second half cycle. If the data on line 10 is a LOGIC 0 during the addressed channel, then no light will be emitted from either LED during the first half cycle, and light will be emitted from LED 186 during the second half cycle. LEDs 178 and 186 are shown in FIG. 10 providing the respective optical actuating signals for the plus and minus, LOGIC 1 and LOGIC 0, sensing functions.

Figure 10:
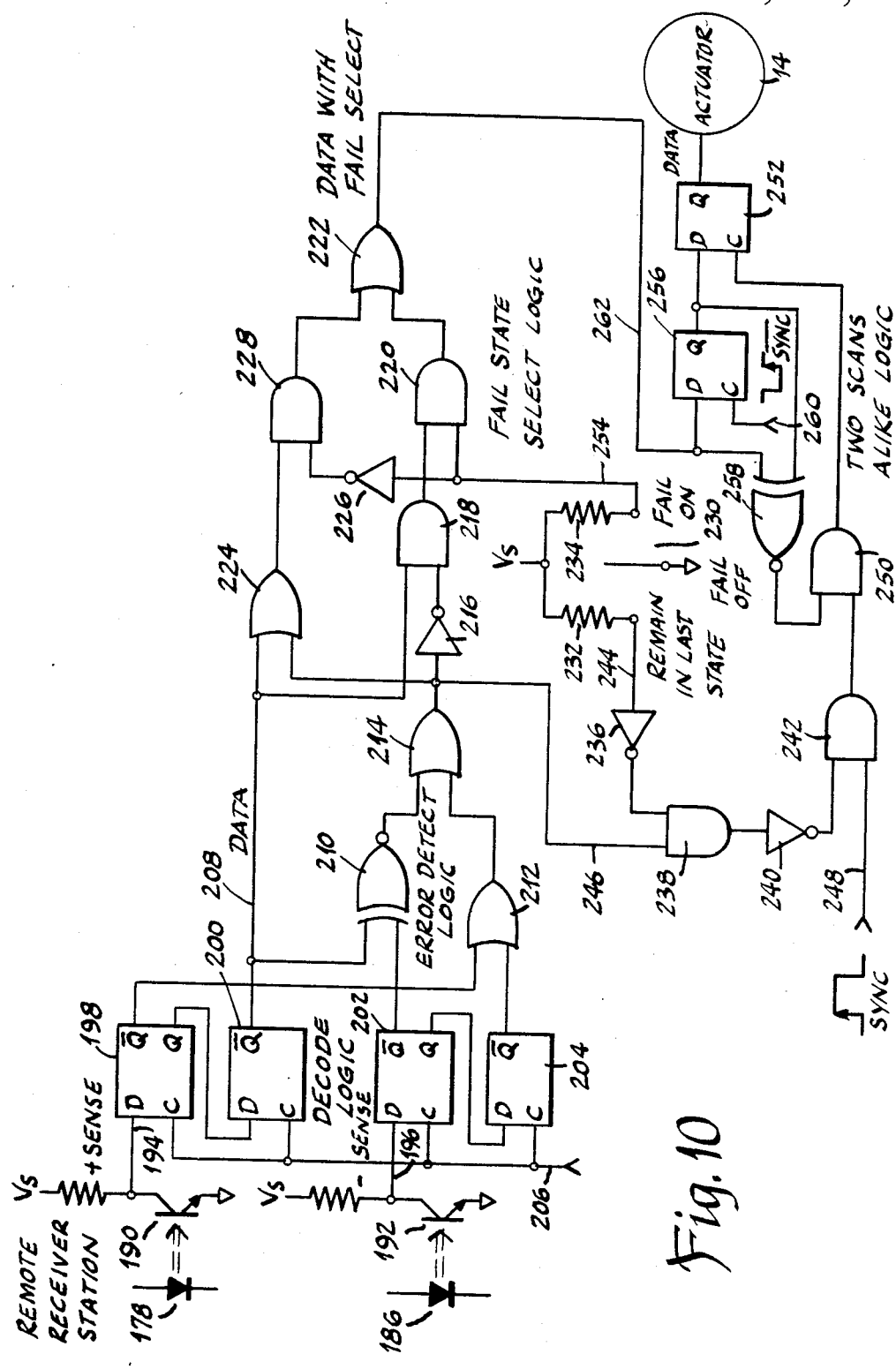
FIG. 10 is a schematic circuit diagram of the other portion of the remote receiver station of FIG. 8.

Referring to FIG. 10, positive current causes LED 178 to emit light, and negative current causes LED 186 to emit light. These LEDs are optically coupled to respective phototransistors 190 and 192 to activate conduction of the latter from voltage source $V_s$. When positive signal current is flowing on data line 10, LED 178 emits light which turns on transistor 190 whereby the plus sense line 194 at the collector of transistor 190 goes low. When there is no positive signal current flowing on data line 10, transistor 190 is nonconductive and the plus sense line 194 is high. When there is negative signal current flowing on data line 10, LED 186 emits light which turns on transistor 192, and the minus sense line 196 at the collector of transistor 192 goes low. When there is no negative signal current on data line 10, transistor 192 is nonconductive and the minus sense line 196 is high.

Decode logic 128 of FIG. 8 includes four flip-flops 198, 200, 202 and 204, FIG. 10, forming a four bit shift register. The plus sense line 194 is connected to the D input of flip-flop 198, and the minus sense line 196 is connected to the D input of flip-flop 202. The Q output of flip-flop 198 is connected to the D input of flip-flop 200, and the Q output of flip-flop 202 is connected to the D input of flip-flop 204. The data at the D inputs of the flip-flops is clocked into the register on each rising edge of pulse train 164, FIG. 9, via connection 206 from the output of AND gate 166.

At the end of a channel time slot, one AC cycle 154, there will have been two clockings by pulse train 164 on line 206. If there was positive signal current flowing on data line 10 during the first half cycle, then the low state on plus sense line 194 would have been clocked through to the Q output of flip-flop 198 during the first half cycle clocking by 164, and then clocked through in inverted state to the $\overline{Q}$ output of flip-flop 200 during the second half cycle clocking by 164, whereby line 208 will have a high state. This would correspond to a LOGIC 1 as seen in FIG. 5. If there was a LOGIC 0 on data line 10 during the addressed channel time slot, then the plus sense line 194 will remain high during both half cycles and the $\overline{Q}$ output of flip-flop 200 on line 208 will be low. Line 208 thus provides the decoded data logic state of the current flow pulses appearing on data line 10, FIGS. 9 and 2. When line 208 is high the data state is a LOGIC 1, and when line 208 is low the data state is a LOGIC 0.

The four flip-flops of the decode logic perform a further decoding function. The plus and minus sense lines 194 and 196 are clocked in once during the first half cycle and again during the second half cycle, with the initial states getting further clocked into a second pair of flip-flops 200 and 204. At the end of a channel, or full AC cycle, there are thus four bits of information that can be used. This information can be checked for the proper sequence, which should appear as shown on the following truth table.

|  | Data on line 10 | |
|---|---|---|
|  | LOGIC 1 | LOGIC 0 |
| Flip-Flop 198 $\overline{Q}$ | Low | Low |
| Flip-Flop 200 $\overline{Q}$ | High | Low |
| Flip-Flop 202 $\overline{Q}$ | Low | High |
| Flip-Flop 204 $\overline{Q}$ | Low | Low |

In all cases, valid data will additionally satisfy the following logic requirements.

(1) The $\overline{Q}$ outputs of flip-flops 198 and 204 must each be low.

(2) The $\overline{Q}$ output of flip-flop 200 cannot have the same state as the $\overline{Q}$ output of flip-flop 202. As noted above, the $\overline{Q}$ output of flip-flop 200 on line 208 is the actual data bit on line 10. Finally, it is noted that data is clocked into the shift register, via 206, only during the addressed channel, due to enabling gate 166, FIG. 9.

Error detect logic 130 of FIG. 8 comprises exclusive NOR gate 210, OR gate 212 and OR gate 214. OR gate 212 checks the requirement that the $\overline{Q}$ outputs of flip-flops 198 and 200 each be low for valid data. If either of the $\overline{Q}$ outputs of flip-flops 198 or 204 goes high, then the output of OR gate 212 goes high and hence the output of OR gate 214 goes high, signaling an error. Exclusive NOR gate 210 checks the requirement that the $\overline{Q}$ outputs of flip-flops 200 and 202 never be the same. Any time the $\overline{Q}$ outputs of flip-flops 200 and 202 are equal, the output of exclusive NOR gate 210 goes high and hence the output of OR gate 214 goes high, again signaling an error.

Fail state select logic 132 of FIG. 8 includes in FIG. 9 inverter 216, AND gate 218, AND gate 200, OR gate 222, OR gate 224, inverter 226, AND gate 228, single pole three position switch 230, pull up resistors 232 and 234, inverter 236, AND gate 238, inverter 240 and AND gate 242. The output of OR gate 222 is the actual data with fail state mode select incorporated. Data is unchanged as long as no errors are detected. If an error is detected, the position of switch 230 will determine the output of OR gate 222.

If switch 230 is in its leftward, remain in last state, position, then line 244 is tied low and the output of inverter 236 is high. If an error is detected, then the output of OR gate 214 on line 246 is also high, and thus both inputs to AND gate 238 are high whereby the output of the latter goes high, and hence the output of inverter 240 goes low. This low state at the input to AND gate 242 disables passage therethrough of the sync pulse on line 248 from the $\overline{Q}$ output of retriggerable monostable multivibrator 120, FIG. 9. The sync clock pulse on 248 thus cannot pass through AND gate 242 nor through AND gate 250, and hence does not reach the final output flip-flop 252, whereby the latter remains in its previous state.

If switch 230 is in its central, fail OFF, position, then line 244 is tied high through resistor 232 to voltage source $V_s$. The high state on line 244 is inverted by inverter 236 to a low state to thus disable AND gate 238 regardless of whether a high error state appears on line 246. The low output of AND gate 238 is inverted high by inverter 240 to thus enable AND gate 242 to allow passage of clock sync pulses therethrough from line 248.

Also when switch 230 is in its central, fail OFF, position, line 254 is tied high through resistor 234 to voltage source $V_s$. When an error is detected, the output of OR gate 214 goes high, which is inverted low by inverter 216 to thus disable AND gate 218 which in turn disables AND gate 220, such that the latter presents a low state at one of the inputs of OR gate 222. The other input of OR gate 222 is also low because the output of AND gate 228 is low since its input from inverter 226 is low, due in turn to the high state on line 254. Both inputs to OR gate 222 are thus low, and hence the latter's output state is low, representing a fail OFF condition.

If switch 230 is in the rightward, fail ON, position, then line 254 is tied low. When an error is detected, the output of OR gate 214 goes high, which output is connected to one of the inputs of OR gate 224, whereby the latter's output goes high. Both inputs to AND gate 228 are thus high, since the output of OR gate 224 is high and since the low state on line 154 has been inverted high by inverter 226. The output of AND gate 228 thus goes high, which in turn causes the output of OR gate 222 to go high, representing a fail ON condition.

Two scans alike logic 136 of FIG. 8 is provided in FIG. 10 by flip-flop 256, exclusive NOR gate 258 and AND gate 250. Transient type errors may otherwise cause the output to change only for a single scan. In high speed communication systems, these changes can be viewed as glitches and may not cause any harm. In industrial control type applications however, these changes in the output state may trigger an undesired actuation. The two scans alike circuit requires that the data be stable for two consecutive scans before any change in the output state of flip-flop 252 occurs.

The sync signal from the Q output of retriggerable monostable multivibrator 120, FIG. 9, is connected on line 260 to the clock input of flip-flop 256, FIG. 10. The data from the output of OR gate 222 is connected on line 262 to the D input of flip-flop 256. On the rising edge of the sync pulse on line 260, the current scan data is clocked into flip-flop 256. At the rising edge of the next sync pulse on line 248, the new data at the D input of flip-flop 256 and the previous scan data at the Q output of flip-flop 256 are compared by exclusive NOR gate 258. If the D input and Q output of flip-flop 256 are the same, then both inputs to exclusive NOR gate 258 are the same and hence the output of exclusive NOR gate 258 will be high, indicating that there are two consecutive scans with the same data. The high state at the output of exclusive NOR gate 258 enables AND gate 250, whereby the sync pulse from line 248 passes through AND gate 250 and clocks flip-flop 252 such that the data value at its D input is clocked through to its Q output and hence to actuator 14.

It is recognized that various modifications are possible within the scope of the appended claims.

We claim:

1. A high noise immunity multiplexing system comprising:
   a master station;
   a plurality of remote stations; and
   a cable comprising three shielded wires linking said master station and said remote stations, two wires of said cable being power lines L1 and L2 for powering and for clocking said remote stations from said master station, such that said remote stations do not require local power supplies and do not require local clocks, a third wire of said cable being a data line, and further comprising a signaling system for carrying data comprising switching said data line into connection with said power lines in accordance with a given signaling format;
   wherein said power lines carry AC power, and said signaling system comprises switching one of said AC power lines into connection with said data line at designated times;
   wherein said signaling system uses one or more AC cycles per multiplex channel and provides data security by recognizing the polarity or the position, or both, of a pulse on said data line relative to an AC cycle.

2. The invention according to claim 1 wherein said signaling system uses a single AC cycle per multiplex channel and provides data security by recognizing both the polarity and the position within a cycle of a pulse on said data line.

3. A high noise immunity multiplexing system comprising:
   a master station;
   a plurality of remote stations; and
   a cable comprising three shielded wires linking said master station and said remote stations, two wires of said cable being power lines L1 and L2 for powering and for clocking said remote stations from said master station, such that said remote stations do not require local power supplies and do not require local clocks, a third wire of said cable being a data line, and further comprising a signaling system for carrying data comprising switching said data line into connection with said power lines in accordance with a given signaling format;
   wherein said power lines carry AC power, and said signaling system comprises switching one of said AC power lines into connection with said data line at designated times;
   wherein:
   one logic state is encoded by closing a switch between said data line and one of said AC power lines during a positive half cycle of the AC waveform, and opening the switch during a negative half cycle of the AC waveform; and
   the opposite logic state is encoded by opening the switch during a positive half cycle of the AC waveform, and closing the switch during a negative half cycle of the AC waveform.

4. A high noise immunity multiplexing system comprising:
   a master station;
   a plurality of remote stations; and
   a cable comprising three shielded wires linking said master station and said remote stations, two wires of said cable being power lines L1 and L2 for powering and for clocking said remote stations from said master station, such that said remote stations do not require local power supplies and do not require local clocks, a third wire of said cable being a data line, and further comprising a signaling system for carrying data comprising switching said data line into connection with said power lines in accordance with a given signaling format;
   wherein said power lines carry AC power, and said signaling system comprises switching one of said AC power lines into connection with said data line at designated times;
   wherein said master station and said remote stations are each linked to said cable through respective transformer means to provide isolation from said cable such that each said remote station may have its own reference potential independently of other remote stations and do not interfere with system operation.

5. The invention according to claim 4 further comprising isolation means comprising a plurality of switch means, one for each said remote station, for switching said data line into connection with said power lines or for reading said data line, each said switch means being optically triggered by addressed channel responsive means at its respective remote station, whereby to provide full isolation of said remote stations from said cable.

6. The invention according to claim 5 wherein said AC power lines also carry system synchronization information, and wherein AC power, clock and synchronization information all are transformer coupled, data being optically coupled, and there being no ohmic connection between said cable and said remote stations.

7. A high noise immunity multiplexing system comprising:
   a master station;
   a plurality of remote stations;
   a cable comprising three shielded wires linking said master station and said remote stations, two wires of said cable being power lines L1 and L2 for powering and for clocking said remote stations from said master station, such that said remote stations do not require local power supplies and do not require local clocks, a third wire of said cable being a data line, wherein said power lines carry AC power; and
   a signaling system for switching said data line into connection with said power lines for carrying signal data using one or more AC cycles per multiplex channel, and wherein said master station includes means for periodically skipping one or more cycles on said AC power lines at given intervals to set scan length and synchronize said remote stations.

8. A high noise immunity multiplexing system comprising:
   a master station for generating power, clocking and synchronization signals;
   a cable comprising three shielded wires, two of which are power lines linked to said master station, the third wire being a data line;
   at least one remote transmitter station linked to said cable and including means synchronized by said synchronization signal and clocked by said clocking signal for connecting one of said power lines to said data line at a given addressed channel; and
   at least one remote receiver station linked to said cable and including means synchronized by said synchronization signal and clocked by said clocking signal for reading the state of said data line at a given addressed channel, wherein:
said master station is linked to said power lines by transformer coupling means;
said remote transmitter station is linked to said power lines by transformer coupling means;
said remote transmitter station is linked to said data line by optical coupling means;
said remote receiver station is linked to said power line by transformer coupling means; and
said remote receiver station is linked to said data line by optical coupling means.

9. The invention according to claim 8 wherein said master station generates an AC waveform which provides power and clocking for said remote stations such that the latter do not require local power supplies or local clocks, and including means for skipping one or more AC cycles at given intervals to synchronize said remote stations and set scan length.

10. The invention according to claim 9 wherein said remote transmitter means includes transmit logic encoding means for connecting one of said power lines to said data line at a given address channel during one or the other of designated periods of said AC waveform according to the data state of a sensor at said remote transmitter station.

11. The invention according to claim 10 wherein said remote transmitter means includes transmit logic encoding means for connecting one of said power lines to said data line during one or the other of designated half cycles of said AC waveform according to the data state of a sensor at said remote transmitter station.

12. The invention according to claim 10 wherein said remote receiver means includes cycle detect and receive enable logic means for reading said data line.

13. The invention according to claim 12 wherein said remote receiver means reads said data line during designated periods of the AC waveform, and including decode logic means for sampling the states of said data line.

14. The invention according to claim 13 wherein said remote receiver means reads said data line during designated first and second half cycles during the AC waveform, and including decode logic means for sampling the positive and negative states of said data line.

15. The invention according to claim 13 wherein the signaling system uses a single AC cycle per multiplex channel and provides data security by recognizing both the polarity and the position of a pulse on said data line within an AC cycle, one logic state being a positive half cycle in sequence with a null half cycle, and the opposite logic state being a null half cycle in sequence with a negative half cycle.

16. The invention according to claim 15 wherein said remote receiver means includes said cycle detect and receive enable logic means for reading said data line at a discrete point during the first half cycle and again at a discrete point during the second half cycle of said AC waveform, and including said decode logic means for sampling the positive and negative states of said data line during each half cycle.

17. A high noise immunity multiplexing system comprising:
(a) a master station outputting an AC waveform providing power and clocking, and periodically skipping one or more AC cycles at given intervals to set scan length and provide synchronization;
(b) a cable comprising three shielded wires, two of which are power lines transformer-coupled to said master station, the third wire being a data line;
(c) at least one remote transmitter station transformer-coupled to said power lines and comprising:
(i) sync detect means responsive to said AC waveform from said last mentioned transformer for detecting said skipped AC cycle;
(ii) address counter means responsive to said sync detect means and clocked by said AC waveform from said last mentioned transformer for generating an address valid output signal at a given addressed channel;
(iii) a sensor data latch responsive to said address valid signal for outputting sensor data;
(iv) transmit logic means responsive to said AC clocking waveform from said last mentioned transformer, and responsive to said address valid signal, and responsive to said sensor data latch, for emitting an optical actuation signal; and
(v) transmit switch means responsive to said optical actuation signal for connecting one of said power lines to said data line; and
(d) at least one remote receiver station transformer-coupled to said power lines and comprising:
(i) sync detect means responsive to said AC waveform from said last mentioned transformer for detecting said skipped AC cycle;
(ii) address counter means responsive to said last mentioned sync detect means and clocked by said AC waveform from said last mentioned transformer for generating an address valid output signal at a given addressed channel;
(iii) receive switch means for reading said data line, and including light emitting means emitting an optic signal in response to current flow on said data line; and
(iv) decode logic means responsive to said optic signal for outputting the decoded logic state of said data line during said addressed channel.

18. The invention according to claim 17 wherein said remote receiver station further comprises receive enable logic means responsive to said address valid signal for emitting an optical actuation signal, said optical actuation signal disconnecting said receive switch means from the data line except at a given address channel.

19. The invention according to claim 17 wherein said remote receiver station comprises:
cycle detect means responsive to said AC waveform from said last mentioned transformer for outputting triggering signals;
receive enable logic means responsive to said triggering signals from said cycle detect means and responsive to said address valid signal, for emitting an optical actuation signal;
said receive switch means being responsive to said last mentioned optical actuation signal for reading said data line, and including first light emitting means emitting a plus sense optic signal in response to one direction of current flow on said data line, and including second light emitting means emitting a minus sense optic signal in response to the opposite direction current flow on said data line; and
said decode logic means being responsive to said plus and minus sense optic signals for outputting the decoded logic state of said data line during said addressed channel.

20. The invention according to claim 19 wherein said remote receiver station cycle detect means responsive to said AC waveform outputs said triggering signal during each half cycle of said AC waveform.

21. The invention according to claim 20 comprising:
a signaling system using a single AC cycle per multiplex channel and providing data security by recognizing both the polarity and the position of a pulse on said data line within an AC cycle, said transmit logic means encoding one logic state on said data line by closing said transmit switch means during the positive half cycle of said AC waveform and opening said transmit switch means during the negative half cycle of said AC waveform, said transmit logic means encoding the opposite logic state on said data line by opening said transmit switch means during the positive half cycle of said AC waveform and closing said transmit switch means during the negative half cycle of said AC waveform;
said receive enable logic means closing said receive switch means during each of the first and second half cycles of said AC waveform during the addressed channel to sample the state of said data line during each half cycle;
and further comprising error detect means in said remote receiver means responsive to said decode logic means and outputting an error signal in response to an invalid combination of polarity and position of said plus and minus sense signals.

22. The invention according to claim 17 comprising:
a signaling system using a single AC cycle per multiplex channel and providing data security by recognizing both the polarity and the position of a pulse on said data line within an AC cycle, said transmit logic means encoding one logic state on said data line by closing said transmit switch means during the positive half cycle of said AC waveform and opening said transmit switch means during the negative half cycle of said AC waveform, said transmit logic means encoding the opposite logic state on said data line by opening said transmit switch means during the positive half cycle of said AC waveform and closing said transmit switch means during the negative half cycle of said AC waveform, said receive switch means including first light emitting means emitting a plus sense optic signal in responsive to one direction of current flow on said data line, and including second light emitting means emitting a minus sense optic signal in response to the opposite direction current flow on said data line;
said receiver further comprising cycle detect means responsive to said AC waveform for outputting trigger signals during each of the first and second half cycles of said AC waveform during the addressed channel to sample the state of said optic signal during each half cycle;
and further comprising error detect means in said remote receiver means responsive to said decode logic means and outputting an error signal in response to an invalid combination of polarity and position of said decoded logic state.

23. The invention according to claim 22 further comprising fail state select logic means in said remote receiver means and responsive to an error signal from said error detect logic means for outputting a data state according to a user preselected option of fail ON, fail OFF, or remain in last state, such that when an error is detected, the output of said fail state select logic will be a user selected LOGIC 1, or LOGIC 0, or will remain in the last valid data state.

24. The invention according to claim 23 wherein:
said decode logic means comprises four flip-flops clocked by the output of said cycle detect means, a first flip-flop responsive to said plus sense signal, a second flip-flop responsive to the output of said first flip-flop, a third flip-flop responsive to said minus sense signal, and a fourth flip-flop responsive to the output of said third flip-flop, the output of one of said flip-flops at the end of a full AC cycle channel being the logic state of said data line;
said error detect logic comprises first OR means responsive to a given logic state output of either of two of said flip-flops to output an error signal, a comparator for comparing the output states of the remaining two flip-flops for outputting an error signal in response to a given relation therebetween, and second OR means responsive to either said first OR means or said comparator means for outputting an error signal;
said fail state select logic means includes user selectable switch means for selecting remain in last state or fail OFF or fail ON, said remain in last state mode tying an input of a first AND gate to a given state to disable the latter and prevent clocking of an output data latch, said fail OFF mode tying the input of a second AND gate to a given state to disable the latter, said error signal disabling a third AND gate, said second and third AND gates being input to an OR gate such that the output of the latter is in an OFF condition when the inputs from said second and third AND gates are disabled, said fail ON mode tying said input of said second AND gate to the opposite state to enable the latter to pass said error signal therethrough to said output OR gate such that the latter is in the ON condition.

25. The invention according to claim 17 further comprising two scans alike logic in said remote receiver station for comparing each scan data state of the addressed channel against the immediately preceeding scan data state, and updating data output only when the two states are the same, to prevent transient glitches from changing the data output state.

26. The invention according to claim 25 wherein:
said two scans alike logic comprises a flip-flop having an input from said decoded logic state, and including means for comparing the input to the output of said last mentioned flip-flop and means responsive thereto to enable said sync signal to clock said output data latch to pass the output of said last mentioned flip-flop therethrough when current scan data for the addressed channel is the same as the data for the immediately preceeding scan, said last mentioned flip-flop being clocked by the inverse of the sync signal to store current scan data for the next scan comparison.

27. The invention according to claim 22 wherein:
said sync detect means comprises a retriggerable monostable multivibrator having a time constant longer than the cycle of said AC waveform;
said transmit logic means comprises exclusive NOR means for changing polarity of said clocking AC waveform from said remote transmitter transformer responsive to the output of said sensor data latch, and AND gate having inputs from said exclusive NOR gate and from said address valid output of said address counter means, a transistor driven into conduction by the output of said last mentioned AND gate to conduct current through a light emitting diode; and said transmit switch means comprises a phototransistor optically coupled to said light emitting diode and biased into conduction by the light emitted therefrom, and connected in a rectifying bridge circuit between said power line and said data line to conduct current therebetween in a direction according to the half cycle of conduction.

28. The invention according to claim 22 wherein:

said cycle detect means comprises a one-shot multivibrator pulser responsive to the clocking AC waveform from said receiver transformer and outputting one-shot pulses at each transition of said clocking AC waveform, and a monostable multivibrator responsive to said oneshot pulses for outputting a triggering waveform of twice the frequency of said AC clocking waveform and having a triggering pulse of given polarity transition occurring during each half cycle of said AC clocking waveform;

said sync detect means comprises retriggerable monostable multivibrator means having a time constant greater than one cycle of said AC clocking waveform;

said receive switch means comprises a rectifying bridge connected to said data line, a first light emitting diode in one branch of said bridge for emitting light when current flows in one direction on said data line, and a second light emitting diode in the other branch of said bridge for emitting light when current flows in the opposite direction on said data line, and further comprising first phototransistor means responsive to said first light emitting diode outputting a plus sense signal, and second phototransistor means responsive to said second light emitting diode outputting a minus sense signal, said plus and minus sense signals being clocked into said decode logic means by said cycle detect triggering pulses.

29. The invention according to claim 21 further comprising fail state select logic means in said remote receiver means and responsive to an error signal from said error detect logic means for outputting a data state according to a user preselected option of fail ON, fail OFF, or remain in last state, such that when an error is detected, the output of said fail state select logic will be a user selected LOGIC 1, or LOGIC 0, or will remain in the last valid data state.

30. The invention according to claim 29 further comprising two scans alike logic in said remote receiver station and responsive to said fail state select logic for comparing each scan data state of the addressed channel against the immediately preceeding scan data state, and updating data only when the two states are the same, to prevent transient glitches from changing the data output state.

31. The invention according to claim 30 wherein:

said decode logic means comprises a shift register including four flip-flops clocked by the output of said cycle detect means through said receive enable logic means, a first flip-flop responsive to said plus sense signal, a second flip-flop responsive to the output of said first flip-flop, a third flip-flop responsive to said minus sense signal, and a fourth flip-flop responsive to the output of said third flip-flop, the output of one of said flip-flops at the end of a full AC cycle channel being the logic state of said data line;

said error detect logic comprises first OR means responsive to a given logic state output of either of two of said flip-flops to output an error signal, a comparator for comparing the output states of the remaining two flip-flops for outputting an error signal in response to a given relation therebetween, and second OR means responsive to either said first OR means or said comparator means for outputting an error signal;

said fail state select logic means includes user selectable switch means for selecting remain in last state or fail OFF or fail ON, said remain in last state mode tying an input of a first AND gate to a given state to disable the latter and prevent clocking of an output data latch, said fail OFF mode tying the input of a second AND gate to a given state to disable the latter, said error signal disabling a third AND gate, said second and third AND gates being input to an OR gate such that the output of the latter is in an OFF condition when the inputs from said second and third AND gates are disabled, said fail ON mode tying said input of said second AND gate to the opposite state to enable the latter to pass said error signal therethrough to said output OR gate such that the latter is in the ON condition; and said two scans alike logic comprises a flip-flop clocked by the inverse of the sync signal from said sync detect means to said address counter means, said flip-flop having an input from said output OR gate of said fail state select logic, and including means for comparing the input to the output of said last mentioned flip-flop and means responsive thereto to enable said sync signal to clock said output data latch to pass the output of said last mentioned flip-flop therethrough when current scan data for the addressed channel is the same as the data for the immediately preceeding scan.

32. The invention according to claim 19 wherein:

said sync detect means comprises a retriggerable monostable multivibrator having a time constant longer than the cycle of said AC waveform;

said transmit logic means comprises exclusive NOR means for comparing said clocking AC waveform from said remote transmitter transformer and the output of said sensor data latch, an AND gate having inputs from said exclusive NOR gate and from said address valid output of said address counter means, a transistor driven into conduction by the output of said last mentioned AND gate to conduct current through a light emitting diode; and said transmit switch means comprises a phototransistor optically coupled to said light emitting diode and biased into conduction by the light emitted therefrom, and connected in a rectifying bridge circuit between said power line and said data line to conduct current therebetween in a direction according to the half cycle of conduction.

33. The invention according to claim 19 wherein:

said cycle detect means comprises a one-shot multivibrator pulser responsive to the clocking AC waveform from said receiver transformer and outputting one-shot pulses at each transition of said clocking AC waveform, and a monostable multivibrator responsive to said one-shot pulses for outputting a triggering waveform of twice the frequency of said AC clocking waveform and having a triggering pulse of given polarity transition occuring during each half cycle of said AC clocking waveform;

said sync detect means comprises retriggerable monostable multivibrator means having a time constant greater than one cycle of said AC clocking waveform;

said receive enable logic means having its input from said address valid output of said address counter means, and transistor means biased into conduction by the output of said AND gate for conducting current through a light emitting diode once during each half cycle of said AC waveform according to said triggering pulse waveform; and said receive switch means comprises a phototransistor optically coupled to said light emitting diode and responsive to light emitted therefrom to conduct current through a rectifying bridge connected to said data line, a second light emitting diode in one branch of said bridge for emitting light when current flows in one direction on said data line, and a third light emitting diode in the other branch of said bridge for emitting light when current flows in the opposite direction on said data line.

* * * * *